United States Patent
Che et al.

(10) Patent No.: US 12,107,223 B2
(45) Date of Patent: Oct. 1, 2024

(54) ELECTROLYTE, ADDITIVE THEREOF, SECONDARY CELL, AND APPLICATION THEREOF

(71) Applicant: SHANGHAI ZIJIAN CHEMICAL TECHNOLOGY CO., LTD, Shanghai (CN)

(72) Inventors: Haiying Che, Shanghai (CN); Yonghong Deng, Shanghai (CN); Xinrong Yang, Shanghai (CN); Zifeng Ma, Shanghai (CN)

(73) Assignee: SHANGHAI ZIJIAN CHEMICAL TECHNOLOGY CO., LTD, Shanghai (CN)

(*) Notice: Subject to any disclaimer, the term of this patent is extended or adjusted under 35 U.S.C. 154(b) by 729 days.

(21) Appl. No.: 17/286,821

(22) PCT Filed: Oct. 29, 2019

(86) PCT No.: PCT/CN2019/113924
§ 371 (c)(1),
(2) Date: Apr. 20, 2021

(87) PCT Pub. No.: WO2020/088436
PCT Pub. Date: May 7, 2020

(65) Prior Publication Data
US 2021/0399341 A1     Dec. 23, 2021

(30) Foreign Application Priority Data

Oct. 29, 2018 (CN) .................. 2018111268942.2
Mar. 7, 2019 (CN) ..................... 201910594885.5

(51) Int. Cl.
H01M 10/00     (2006.01)
H01M 10/0567  (2010.01)
(Continued)

(52) U.S. Cl.
CPC ... *H01M 10/0567* (2013.01); *H01M 10/0568* (2013.01); *H01M 10/0569* (2013.01);
(Continued)

(58) Field of Classification Search
CPC ......... H01M 10/0567; H01M 10/0569; H01M 10/0568
See application file for complete search history.

(56) References Cited

U.S. PATENT DOCUMENTS

2014/0042988 A1* 2/2014 Kuttipillai ........... H01M 50/423
                                                           320/167
2017/0358827 A1* 12/2017 Suzuki ............. H01M 10/0569
2018/0251681 A1* 9/2018 Zhang ............... H01M 10/0567

FOREIGN PATENT DOCUMENTS

CN     101079504 A     11/2007
CN     107134592 A     9/2017
(Continued)

OTHER PUBLICATIONS

Second Office Action dated Apr. 8, 2022 issued in Chinese Patent Application No. 2018112689422.
(Continued)

*Primary Examiner* — Cynthia H Kelly
*Assistant Examiner* — Monique M Wills
(74) *Attorney, Agent, or Firm* — Houston Beshining Law Office PLLC; Liangang Ye

(57) ABSTRACT

The present invention relates to an electrolyte, an additive thereof, a secondary cell, and an application thereof. An organic electrolyte according to a first aspect of the invention comprises a salt, a phosphate ester and a fluoroether, and does not comprise a carbonate ester. The salt is a lithium salt or a sodium salt. The electrolyte according to a second aspect of the invention comprises a base electrolyte and an additive. The base electrolyte comprises a sodium salt and a (Continued)

flame retardant solvent. The flame retardant solvent comprises a phosphate ester and a fluoroether. The additive comprises a fluorine-containing additive. The electrolyte and the secondary cell of the present invention increase safety.

20 Claims, 7 Drawing Sheets

(51) Int. Cl.
H01M 10/0568 (2010.01)
H01M 10/0569 (2010.01)
H01M 10/0525 (2010.01)
H01M 10/054 (2010.01)

(52) U.S. Cl.
CPC ...... H01M 10/0525 (2013.01); H01M 10/054 (2013.01); H01M 2300/0028 (2013.01)

(56) References Cited

FOREIGN PATENT DOCUMENTS

CN 109786840 A 5/2019
CN 110518287 A 11/2019

OTHER PUBLICATIONS

J. Electrochem. Soc., 149 (5) A622-A626, 2002.
J.Electrochem.Soc. 153(1)A135-A139,2006.
Jun Liu (Nature energy, 3 (2018) 674-681.
Atsuo Yamada (Nature energy, 3 (2018) 22-29,2018).
Nov. 23, 2020 First Office Action issued in priority application CN201910594885.5.
May 21, 2021 Second Office Action issued in priority application CN201910594885.5.
Aug. 17, 2021 Third Office Action issued in priority application CN201910594885.5.
Jul. 5, 2021 First Office Action issued in priority application CN201811268942.2.
Feb. 5, 2020 International Search Report issued in International Patent Application No. PCT/CN2019/113924.
Feb. 5, 2020 Written Opinion of the International Searching Authority issued in International Patent Application No. PCT/CN2019/113924.

* cited by examiner

ELECTROLYTE, ADDITIVE THEREOF, SECONDARY CELL, AND APPLICATION THEREOF

The present application is a National Stage of International Application No. PCT/CN2019/113924, filed on Oct. 29, 2019, which claims priority of Chinese patent application 2018112689422 dated Oct. 29, 2018, and the priority of Chinese patent application 2019105948855 dated Jul. 3, 2019. The contents of the Chinese patent application are incorporated herein by reference in their entireties.

TECHNICAL FIELD

The present disclosure relates to an electrolyte, an additive thereof, a secondary cell and an application thereof.

BACKGROUND

In lithium/sodium ion cells, the performance of the electrolyte directly determines the performance of lithium/sodium ion cells, and affects the cycle life, safety, energy density and use environment of the lithium/sodium ion cells. At present, the commonly used electrolyte is carbonate ester. A large amount of flame retardant solvent is added in order to overcome the flammable defect of carbonate electrolyte, but the electrochemical performance is accordingly decreased; increasing the salt concentration cannot balance the nonflammability and the electrochemical performance, but result in greater viscosity of the electrolyte. Therefore, it is urgent to find an electrolyte which can overcome the above difficulties and hinder the reaction between the electrode and the electrolyte with good thermal stability, hard decomposition of the SEI film on the surface, and low cost.

CONTENT OF THE PRESENT DISCLOSURE

The first aspect of the present disclosure provides an organic electrolyte, wherein the organic electrolyte comprises a salt, a phosphate ester and a fluoroether, and does not comprise a carbonate ester; the salt is a lithium salt or a sodium salt;

The structural formula of the phosphate ester is represented by formula (1) or formula (2), wherein $R_1$, $R_2$ and $R_3$ are a $C_1$-$C_8$ alkyl or an aryl independently;

The structural formula of the fluoroether is represented by formula (3), wherein R4 and R6 are fluorinated or partially fluorinated carbon chains of $C_1$-$C_4$ independently, $R_5$ is a fluorinated or partially fluorinated carbon chain of $C_0$, $C_2$ or $C_3$, and n is 1, 2, 3 or 4;

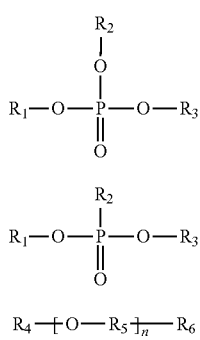

The volume of the phosphate ester is 20%-65% of the volume of the organic electrolyte;

The concentration of the lithium salt relative to the phosphate ester is greater than or equal to 3.5 mol/L;

The concentration of a sodium salt relative to the phosphate ester is greater than or equal to 3 mol/L.

The structural formula of the phosphate ester is represented by formula (1) or formula (2), wherein $R_1$, $R_2$ and $R_3$ are an alkyl or an aryl of $C_1$-$C_8$ independently;

In the first aspect of the present disclosure, $R_1$, $R_2$ and $R_3$ are preferably a methyl (—$CH_3$), ethyl (—$CH_2CH_3$), a phenyl or a tolyl group independently, for example, the phosphate ester may be a trimethyl phosphate, a triethyl phosphate, a tritolyl phosphate, a triphenyl phosphate, a dimethyl methyl phosphate or a diethyl ethyl phosphate.

In the first aspect of the present disclosure, $R_4$ and $R_6$ are preferably —$CH_2$—$CF_3$, —$CF_2$—$CHF_2$, —$CF_2$—$CF_3$, —$CF_2CF_2CF_3$, —$CH_2CF_2CF_3$, and —$CH_2CF_2CHF_2$ independently. $R_5$ preferably is $C_0$ (i.e. absent) or $C_2$. n is preferably 1, 2, or 3, for example, the fluoroether may be a 1,1,2,2-tetrafluoroethyl-2,2,3,3-tetrafluoropropyl ether, a 1,1,2,2-tetrafluoroethyl-2,2,2 trifluoroethyl ether, or a 2H-perfluoro (5-methyl-3,6-dioxonane).

In the first aspect of the present disclosure, the lithium salt is a lithium salt commonly used in the art, for example, may be one or more of a lithium bistrifluoromethanesulfonimide, a lithium trifluoromethylsulfonylmethane, a lithium bis(fluorosulfonyl)imide, and a lithium bis-perfluoroethylsulfonimide.

In the first aspect of the present disclosure, the sodium salt is a sodium salt commonly used in the art, for example, may be one or more of a sodium bis-trifluoromethylsulfonylimide, a sodium trifluoromethylsulfonylmethane, a sodium bis(fluorosulfonyl)imide, and a sodium bis-perfluoroethylsulfonimide.

In the first aspect of the present disclosure, the volume of the phosphate ester may be 33.3-50% of the volume of the organic electrolyte, and may also be 40%.

In the first aspect of the present disclosure, when the salt is a lithium salt, the concentration of the lithium salt relative to the organic electrolyte may be 1-2 mol/L, or may be 1.5 mol/L.

In the first aspect of the present disclosure, the concentration of the lithium salt relative to the phosphate ester may be 3.5-8 mol/L, 4-5 mol/L, or 4.5 mol/L.

In the first aspect of the present disclosure, when the salt is a sodium salt, the concentration of the sodium salt relative to the organic electrolyte may be 0.8-2 mol/L, or may be 1.5 mol/L.

In the first aspect of the present disclosure, the concentration of the sodium salt relative to the phosphate ester may be 3-8 mol/L, or may be 3.2-3.75 mol/L.

In the first aspect of the present disclosure, the organic electrolyte is free of any additive.

In the first aspect of the present disclosure, the organic electrolyte consists of the salt, the phosphate ester and the fluoroether.

The first aspect of the present disclosure also provides a method for preparing an organic electrolyte of the first aspect, wherein the method comprises the following step of mixing well the phosphate ester, the fluoroether and the salt.

In the first aspect of the present disclosure, the mixing process is preferably performed under the protection of an inert gas, for example, the mixing may be performed in a glove box, wherein the inert gas is preferably argon.

The first aspect of the present disclosure also provides an application of an organic electrolyte of the first aspect described above in a secondary cell.

In the first aspect of the present disclosure, the secondary cell may be a lithium secondary cell or a sodium secondary cell.

The first aspect of the present disclosure also provides a secondary cell, wherein the electrolyte of the secondary cell is the organic electrolyte of the first aspect of the present disclosure.

The second aspect of the present disclosure provides an electrolyte comprising a base electrolyte and an additive, wherein the base electrolyte comprises a sodium salt and a flame retardant solvent;

The flame retardant solvent comprises a phosphate ester and a fluoroether, wherein the additive comprises a fluorine-containing additive; the concentration of the sodium salt relative to the base electrolyte is 1-2 mol/L, and the concentration of the sodium salt relative to the phosphate ester is 1.5-3 mol/L; the volume ratio of the phosphate ester to the fluoroether is 1:1 to 2:1; the mass percentage of the content of the additive to the base electrolyte is greater than 0, and less than or equal to 5 wt %.

In the second aspect of the present disclosure, the sodium salt may be a salt commonly used in the art, preferably a sodium hexafluorophosphate and/or a sodium perchlorate.

In the second aspect of the present disclosure, the phosphate ester is preferably one or more of a trimethyl phosphate, a triethyl phosphate, a tritolyl phosphate, a triphenyl phosphate, a dimethyl methyl phosphate and a diethyl ethyl phosphate.

In the second aspect of the present disclosure, the trimethyl phosphate is preferably an anhydrous trimethyl phosphate.

In the second aspect of the present disclosure, the fluoroether is preferably one or more of a 1,1,2,2-tetrafluoroethyl-2,2,3,3-tetrafluoropropyl ether, a 1,1,2,2-tetrafluoroethyl-2,2,2 trifluoroethyl ether, and a 2H-perfluoro (5-methyl-3,6-dioxonane).

In the second aspect of the present disclosure, the fluorine-containing additive is preferably a fluoroethylene carbonate. In the first aspect of the present disclosure, the concentration of the sodium salt relative to the phosphate ester is preferably 2.25 mol/L.

In the second aspect of the present disclosure, the concentration of the sodium salt relative to the base electrolyte is preferably 1.5 mol/L.

In the second aspect of the present disclosure, the volume ratio of the phosphate ester to the fluoroether is preferably 2:1.

In the second aspect of the present disclosure, the mass percentage of the content of the additive to the base electrolyte is preferably 2 wt %.

In a preferred embodiment of the second aspect of the present disclosure, the electrolyte is free of carbonate ester.

In a preferred embodiment of the second aspect of the present disclosure, the electrolyte consists of the sodium salt, the phosphate ester, the fluoroether, and the additive.

The second aspect of the present disclosure also provides a method for preparing the electrolyte, wherein the method comprises the following step of mixing well the base electrolyte and the additive.

In the second aspect of the present disclosure, the mixing is preferably performed under an inert atmosphere, for example, the mixing may be performed in a glove box, wherein the inert atmosphere is preferably argon.

The second aspect of the present disclosure also provides an application of an organic electrolyte of the first aspect described above in a secondary cell.

In the second aspect of the present disclosure, the secondary cell may be a sodium secondary cell.

The second aspect of the present disclosure also provides a secondary cell, wherein the electrolyte of the secondary cell is the electrolyte provided in the second aspect described above.

In the second aspect of the present disclosure, the cathode material of the secondary cell may be a material commonly used in the art, preferably a lamellar metal oxide, and more preferably $NaNi_{1/3}Fe_{1/3}Mn_{1/3}O_3$ (NFM).

In the second aspect of the present disclosure, the anode material of the secondary cell may be a material commonly used in the art, preferably a carbon material, and more preferably a hard carbon (HC).

Without violating common sense in the art, each preferred conditions described above may be arbitrarily combined to obtain a preferred example of each of the first and second aspects of the present disclosure.

Reagents and raw materials used in the first and second aspects of the present disclosure are commercially available.

Unless otherwise specified, the volume percentage of each component in the organic solvent=volume of each component in the organic solvent/total volume of the organic solvent×100%. The mass percentage of each component in the additive (wt %)=the mass of each component in the additive/the total mass of the electrolyte of the sodium ion cell×100%.

The positive progressive effect of the first aspect of the present disclosure is as follows:

The highly safe organic electrolyte of the first aspect of the present disclosure is nonflammable, and has good compatibility and wettability with electrode materials and PP/PE membranes. When the organic electrolyte of the first aspect of the present disclosure is used in a secondary cell, a metallic lithium or sodium is used as an negative electrode; thus obtained secondary cell has advantages of high safety, high and stable coulombic efficiency, good charge-discharge performance, and low manufacturing cost.

The positive progressive effect of the second aspect of the present disclosure is as follows:

The electrolyte of the second aspect of the present disclosure has thermal stability and non-flammability, overcomes the defect that the flame retardant performance and the electrochemical performance of the electrolyte cannot be balanced due to the large amount of flame retardant solvent in the case of using a low concentration of salt, and has charge-discharge performance comparable to that of the electrolyte with the carbonate ester as a solvent; a stable SEI membrane is formed to hinder the reaction between the electrode and the electrolyte, so the thermal stability of the electrolyte is good; therefore, the electrolyte is highly safe. The sodium ion cell prepared from the electrolyte of the present disclosure has high safety, rich sodium resources and low manufacturing cost in the large-scale industrial production process, and is suitable for industrial production.

DETAILED DESCRIPTION OF THE EMBODIMENT

Figure 1:
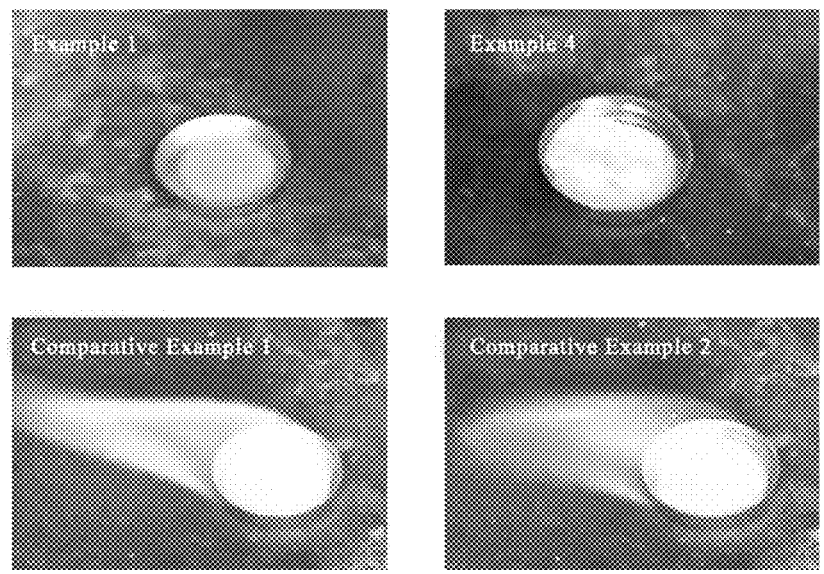
FIG. 1 is a comparative chart of a flammability test of organic electrolytes of Example 1, Example 4, Comparative Example 1 and Comparative Example 2 of the present disclosure.

The following examples further illustrate the present disclosure, but the present disclosure is not limited thereto. In the following examples, experimental methods without specific conditions are selected according to conventional methods and conditions, or according to the product specification.

Example 1

After mixing well an anhydrous trimethyl phosphate with a 1,1,2,2-tetrafluoroethyl-2,2,3,3-tetrafluoropropyl ether in a volume ratio of 1:2, and adding a lithium bis(fluorosulfonyl) imide to prepare a 1.5 mol/L electrolyte, wherein all operations were performed in a glove box filled with argon.

Example 2

After mixing well an anhydrous triethyl phosphate with a 1,1,2,2-tetrafluoroethyl-2,2,3,3-tetrafluoropropyl ether in a volume ratio of 2:3, and adding a lithium bis(fluorosulfonyl) imide to prepare a 2 mol/L electrolyte, wherein all operations were performed in a glove box filled with argon.

Example 3

After mixing well an anhydrous trimethyl phosphate with a 1,1,2,2-tetrafluoroethyl-2,2,2 trifluoroethyl ether in a volume ratio of 1:1, and adding a lithium bistrifluoromethanesulfonimide to prepare a 2 mol/L electrolyte, wherein all operations were performed in a glove box filled with argon.

Example 4

After mixing well an anhydrous trimethyl phosphate with a 1,1,2,2-tetrafluoroethyl-2,2,3,3-tetrafluoropropyl ether in a volume ratio of 1:2, and adding a sodium bis(fluorosulfonyl) imide to prepare a 1 mol/L electrolyte, wherein all operations were performed in a glove box filled with argon.

Example 5

After mixing well an anhydrous tritolyl phosphate with a 2H-perfluoro (5-methyl-3,6-dioxonane) in a volume ratio of 1:3, and adding a sodium bis(fluorosulfonyl)imide to prepare a 0.8 mol/L electrolyte, wherein all operations were performed in a glove box filled with argon.

Example 6

After mixing well an anhydrous triphenyl phosphate with a 1,1,2,2-tetrafluoroethyl-2,2,2 trifluoroethyl ether in a volume ratio of 2:3, and adding a lithium bis-perfluoroethylsulfonimide to prepare a 1.5 mol/L electrolyte, wherein all operations were performed in a glove box filled with argon.

Example 7

After mixing well an anhydrous trimethyl phosphate with a 1,1,2,2-tetrafluoroethyl-2,2,3,3-tetrafluoropropyl ether in a volume ratio of 1:3, and adding a lithium bis(fluorosulfonyl) imide to prepare a 2 mol/L electrolyte, wherein all operations were performed in a glove box filled with argon.

Example 8

After mixing well an anhydrous trimethyl phosphate with a 1,1,2,2-tetrafluoroethyl-2,2,3,3-tetrafluoropropyl ether in a volume ratio of 1:3, and adding a sodium bis(fluorosulfonyl) imide to prepare a 2 mol/L electrolyte, wherein all operations were performed in a glove box filled with argon.

Comparative Example 1

After mixing well an anhydrous ethylene carbonate (EC) with an ethyl methyl carbonate (EMC) in a volume ratio of 3:7, adding a lithium hexafluorophosphate to prepare a 1 mol/L electrolyte, wherein all operations were performed in a glove box filled with argon.

Comparative Example 2

After mixing well an anhydrous propylene carbonate (PC) with an ethyl methyl carbonate (EMC) in a volume ratio of 1:1, adding 1 mol/L of lithium hexafluorophosphate and the fluoroethylene carbonate (FEC) with a mass of 2 wt % of the electrolyte described above to prepare an electrolyte, wherein all operations were performed in a glove box filled with argon.

Comparative Example 3

After mixing well an anhydrous trimethyl phosphate with a 1,1,2,2-tetrafluoroethyl-2,2,3,3-tetrafluoropropyl ether in a volume ratio of 1:1, and adding a lithium bis(fluorosulfonyl) imide to prepare a 1 mol/L electrolyte, wherein all operations were performed in a glove box filled with argon (in the Comparative Example, the concentration of the lithium salt relative to the phosphate ester does not reach 3.5 mol/L).

Comparative Example 4

After mixing well an anhydrous trimethyl phosphate with a 1,1,2,2-tetrafluoroethyl-2,2,3,3-tetrafluoropropyl ether in a volume ratio of 4:1, and adding a lithium bis(fluorosulfonyl) imide to prepare a 2 mol/L electrolyte, wherein all operations were performed in a glove box filled with argon.

Effect Example 1

All methods for evaluating performance of cells in the present disclosure are performed in accordance with the industry standards.

Performing a charge-discharge performance test of a secondary cell using the electrolyte of the present disclosure. First charging and discharging the cell at a low current density of 0.1 C, and then performing a cycling test at a current density of 1 C.

Performing constant-current charge-discharge tests for Cu/Li and Al/Na cells to investigate coulombic efficiencies of cells using different electrolytes with metallic lithium or sodium as a negative electrode. After discharging at a constant current density of 0.5 mA/cm$^2$ for 2 h, charging to 1.5 V at a constant current.

According to FIG. 1, the electrolyte of the present disclosure (Examples 1 and 4) has a nonflammable property under a fire source condition for a sufficient time. Under the same conditions, the carbonate ester (Comparative Example 1 and Comparative Example 2) electrolytes may continue to burn after leaving a fire source until the electrolyte is completely burnt. Thus, the electrolyte of the present disclosure has significant advantages in improving the safety of cells.

Figure 2:
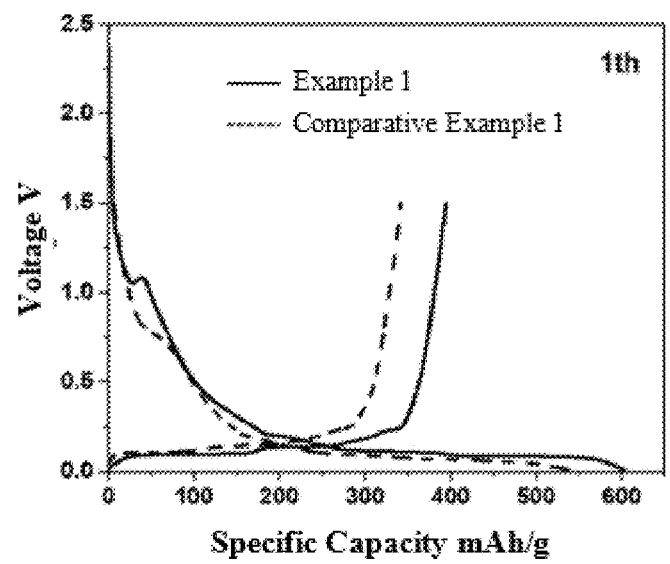
FIG. 2 is a first-cycle charge-discharge curve of a graphite/Li negative electrode using electrolytes of Example 1 and Comparative Example 1 of the present disclosure.
Figure 3:
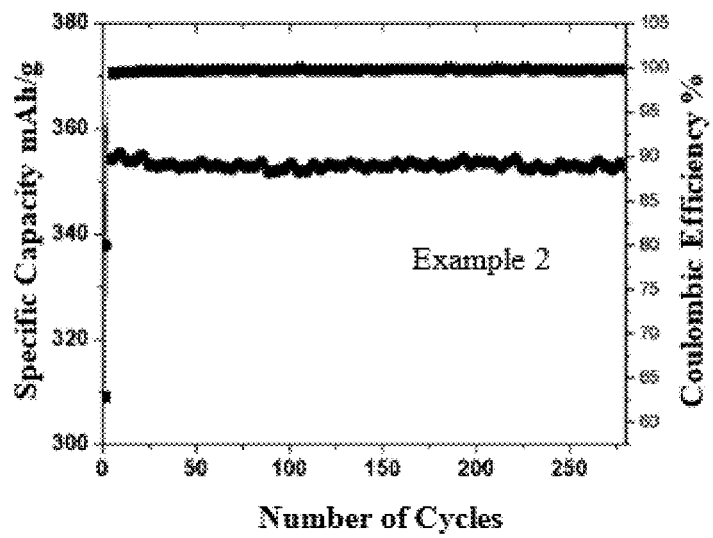
FIG. 3 shows cycling performance of a graphite/Li cell using an electrolyte of Example 2 of the present disclosure.

According to FIGS. 2 and 3, the electrolyte of the present disclosure has good electrochemical performance when applied to a graphite anode of a lithium ion secondary cell. The first-cycle charge-discharge capacity of Example 1 in FIG. 2 is 394 mAh/g (charge)/604 mAh/g (discharge), respectively, and the first-cycle efficiency is 65.2%, so the electrolyte has more excellent performance compared with the conventional carbonate ester electrolyte (Comparative Example 1) with the first-cycle charge-discharge capacity of 341 mAh/g (charging)/537.9 mAh/g (discharge) and the first-cycle efficiency of 63.4%. In FIG. 3, the electrolyte of Example 2 shows similar first-cycle efficiencies as conventional electrolytes, while the cell has good cycling stability.

Therefore, the electrolyte of the present disclosure can improve the safety of the cell, and also shows good electrochemical performance.

Figure 4:
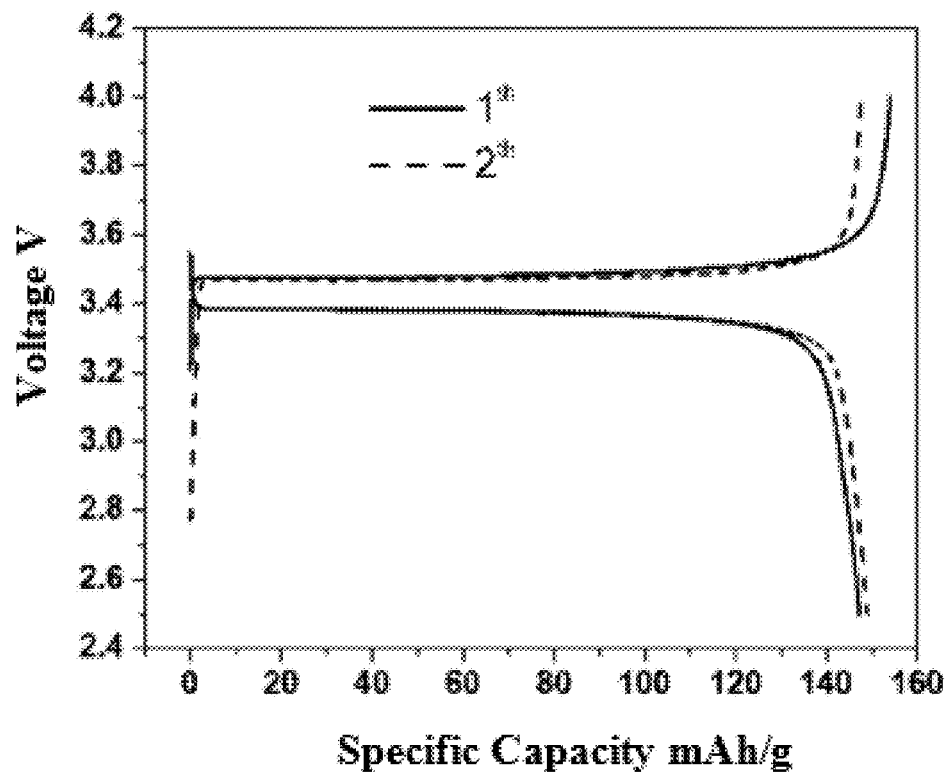
FIG. 4 is a charge-discharge curve of a LiFePO$_4$/Li cell using an electrolyte of Example 3 of the present disclosure.

FIG. 4 shows the application performance of the electrolyte of the present disclosure (Example 3) in a lithium cell cathode material, the lithium iron phosphate. As shown in FIG. 4, the electrolyte of the present disclosure has a good charge-discharge curve, with the first-cycle efficiency above 95% and the second efficiency of 100%.

Figure 5:
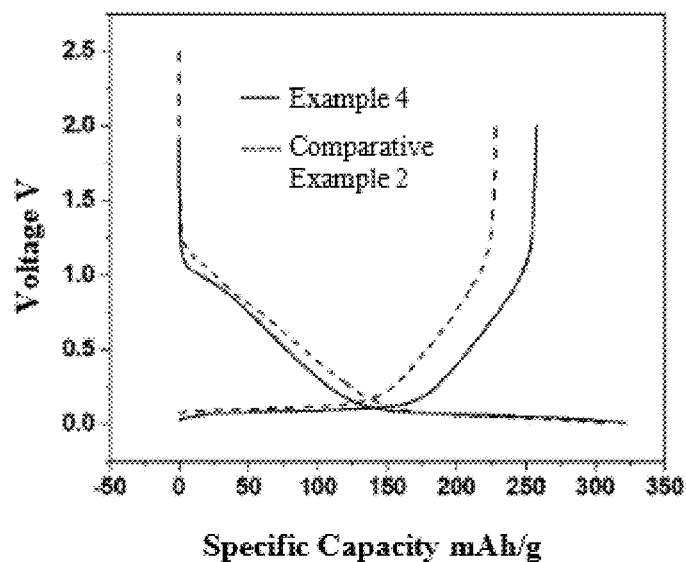
FIG. 5 is a charge-discharge curve of a HC/Na cell using an electrolyte of Example 4 of the present disclosure.

FIG. 5 shows good electrochemical performance of the electrolyte of the present disclosure when applied to a hard carbon anode of a sodium ion secondary cell. In FIG. 5, the first-cycle charge-discharge capacity of Example 4 is 257.8 mAh/g (charge)/321.6 mAh/g (discharge), respectively, and the first-cycle efficiency is 80.2%, so the electrolyte has more excellent performance compared with the conventional carbonate ester electrolyte (Comparative Example 2) with the first-cycle charge-discharge capacity of 227.8 mAh/g (charging)/309 mAh/g (discharge) and the first-cycle efficiency of 73.7%.

Figure 6:
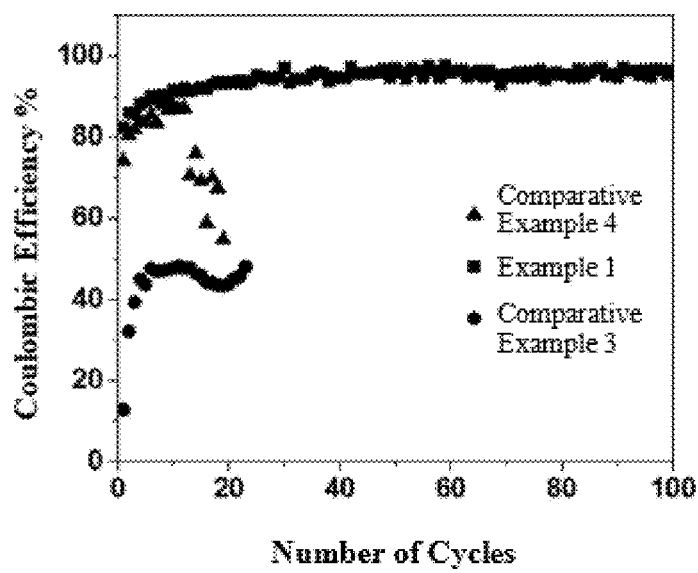
FIG. 6 is a comparative chart of Coulombic efficiencies of a Cu/Li cell using electrolytes of Example 1, Comparative Example 3 and Comparative Example 4 of the present disclosure.

FIG. 6 shows the deposition and dissolution efficiency of a metallic lithium on Cu in the electrolyte of the present disclosure. By comparison with Comparative Examples 3 and 4, the electrolyte of the present disclosure has a good coulombic efficiency using a metallic lithium as a negative electrode; while the coulombic efficiencies of Comparative Examples 3 and 4 are much lower than that of Example 1, and are unstable.

Figure 7:
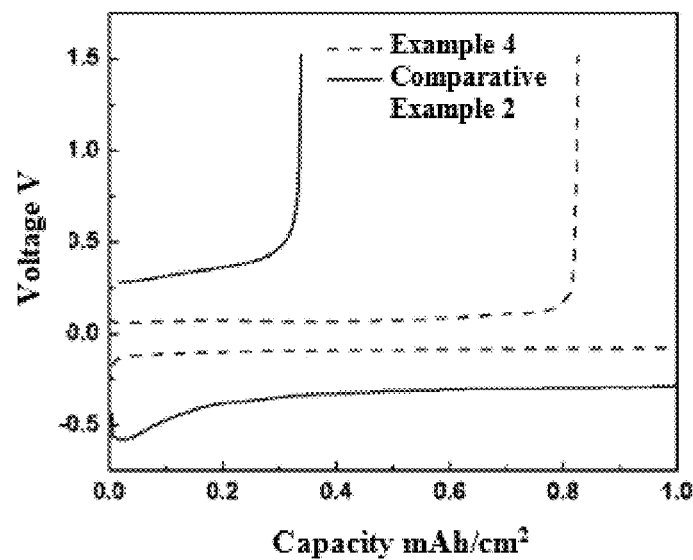
FIG. 7 is a comparative chart the first-cycle coulombic efficiencies of an Al/Na cell using electrolytes of Example 4 and Comparative Example 2 of the present disclosure.

FIG. 7 shows the first-cycle coulombic efficiency for deposition and dissolution of a metallic sodium on A1 of the electrolyte of the present disclosure. By comparison, the first-cycle coulombic efficiency of the electrolyte of the present disclosure is much higher than that of the conventional carbonate ester.

In Example 7 and Example 8, the deposition and dissolution efficiency of a metallic lithium on Cu and the deposition and dissolution efficiency of metallic sodium on A1 are much higher than those of the conventional carbonate easter; the electrolyte also has good electrochemical performance when applied to secondary cells.

In the following Examples and Comparative Examples, methods for preparing the electrolyte comprises the following step of mixing well the base electrolyte and the additive, wherein all mixing procedures are performed in a glove box filled with argon.

Examples 9-14 and Comparative Examples 5-11

Each component of each of the electrolytes prepared in Examples 9-14 and Comparative Examples 5-11 are shown in Table 1, and the content of each component is shown in Table 2.

TABLE 1

| | Each Component of Electrolyte | | | |
|---|---|---|---|---|
| No. | Phosphate Ester | Fluoroether | Sodium Salt | Additive |
| Example 9 | Anhydrous Trimethyl Phosphate | 1,1,2,2-Tetrafluoroethyl-2,2,3,3-Tetrafluoropropyl Ether | Sodium Hexafluorophosphate | Fluoroethylene Carbonate |
| Example 10 | Anhydrous Trimethyl Phosphate | 1,1,2,2-Tetrafluoroethyl-2,2,3,3-Tetrafluoropropyl Ether | Sodium Hexafluorophosphate | Fluoroethylene Carbonate |

TABLE 1-continued

| | | Each Component of Electrolyte | | |
|---|---|---|---|---|
| Example 11 | Anhydrous Trimethyl Phosphate | 1,1,2,2-Tetrafluoroethyl-2,2,3,3-Tetrafluoropropyl Ether | Sodium Hexafluorophosphate | Fluoroethylene Carbonate |
| Example 12 | Anhydrous Trimethyl Phosphate | 1,1,2,2-Tetrafluoroethyl-2,2,3,3-Tetrafluoropropyl Ether | Sodium Hexafluorophosphate | Fluoroethylene Carbonate |
| Example 13 | Anhydrous Trimethyl Phosphate | 1,1,2,2-Tetrafluoroethyl-2,2,3,3-Tetrafluoropropyl Ether | Sodium Perchlorate | Fluoroethylene Carbonate |
| Example 14 | Anhydrous Trimethyl Phosphate | 1,1,2,2-Tetrafluoroethyl-2,2,3,3-Tetrafluoropropyl Ether | Sodium Hexafluorophosphate | Fluoroethylene Carbonate |

| | | Solvent | Sodium Salt | Additive |
|---|---|---|---|---|
| Comparative Example 5 | Anhydrous Ethylene Carbonate | Diethyl Carbonate | Sodium Hexafluorophosphate | Fluoroethylene Carbonate |
| Comparative Example 6 | Anhydrous Trimethyl Phosphate | 1,1,2,2-Tetrafluoroethyl-2,2,3,3-Tetrafluoropropyl Ether | Sodium Hexafluorophosphate | — |
| Comparative Example 7 | Anhydrous Trimethyl Phosphate | 1,1,2,2-Tetrafluoroethyl-2,2,3,3-Tetrafluoropropyl Ether | Sodium Hexafluorophosphate | — |
| Comparative Example 8 | Anhydrous Trimethyl Phosphate | 1,1,2,2-Tetrafluoroethyl-2,2,3,3-Tetrafluoropropyl Ether | Sodium Hexafluorophosphate | — |
| Comparative Example 9 | Anhydrous Trimethyl Phosphate | 1,1,2,2-Tetrafluoroethyl-2,2,3,3-Tetrafluoropropyl Ether | Sodium Perchlorate | — |
| Comparative Example 10 | Anhydrous Trimethyl Phosphate | 1,1,2,2-Tetrafluoroethyl-2,2,3,3-Tetrafluoropropyl Ether | Sodium Hexafluorophosphate | — |
| Comparative Example 11 | Anhydrous Trimethyl Phosphate | 1,1,2,2-Tetrafluoroethyl-2,2,3,3-Tetrafluoropropyl Ether | Sodium Hexafluorophosphate | — |

TABLE 2

| | Content of Each Component of Electrolyte | | | |
|---|---|---|---|---|
| | Concentration of Sodium Salt Relative to Base Electrolyte (mol/L) | Concentration of Sodium Salt Relative to Phosphate Ester (mol/L) | Volume Ratio of Phosphate ester to Fluoroether | Mass Percentage of Content of Additive to Base Electrolyte (wt %) |
| Example 9 | 1.5 | 3 | 1:1 | 2 |
| Example 10 | 1.5 | 2.25 | 2:1 | 2 |
| Example 11 | 1 | 1.5 | 2:1 | 2 |
| Example 12 | 2 | 3 | 2:1 | 2 |
| Example 13 | 1.5 | 2.25 | 2:1 | 2 |
| Example 14 | 1.5 | 2.25 | 2:1 | 5 |

TABLE 2-continued

| | Concentration of Sodium Salt Relative to Base Electrolyte (mol/L) | Volume Ratio of Ethylene Carbonate to Diethyl Carbonate | | Mass Percentage of Additive Relative to Base Electrolyte (wt %) |
|---|---|---|---|---|
| Comparative Example 5 | 1 | 1:1 | | 2 |
| Comparative Example 6 | 1 | 2 | 1:1 | 0 |
| Comparative Example 7 | 1 | 1.5 | 2:1 | 0 |
| Comparative Example 8 | 2 | 3 | 2:1 | 0 |
| Comparative Example 9 | 1.5 | 2.25 | 2:1 | 0 |
| Comparative Example 10 | 1.5 | 3 | 1:1 | 0 |
| Comparative Example 11 | 1.5 | 2.25 | 2:1 | 0 |

Wherein the electrochemical performance and flammability of the electrolyte of the present disclosure are investigated by using the phosphate ester and the fluoroether instead of conventional carbonate solvents in Comparative Example 5; the electrochemical performance of the electrolyte is investigated in absence of the additive fluoroethylene carbonate in Comparative Examples 6-11.

Effect Example 2

All methods for evaluating performance of cells in the present disclosure are performed in accordance with the industry standards.

Performing a charge-discharge performance test of a secondary cell using the electrolyte of the present disclosure. First, charging and discharging the cell at a low current density of 0.1 C, and then performing a cycling test at a current density of 1 C.

Figure 8:
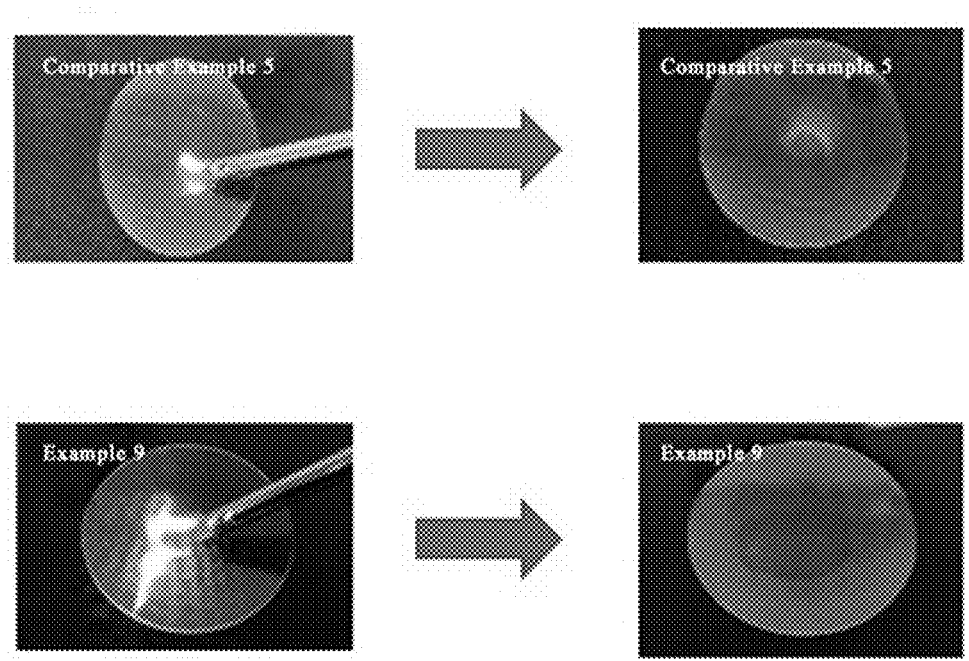
FIG. 8 is a comparative chart of a flammability test of electrolytes of Example 9 and Comparative Example 5 of the present disclosure.

According to FIG. 8, the electrolyte prepared in Example 9 of the present disclosure has a nonflammable property under a fire source condition for a sufficient time. Under the same conditions, the carbonate ester electrolyte prepared in Comparative Example 5 may continue to burn after leaving a fire source until the electrolyte is completely burnt. Thus, the electrolyte of the present disclosure has significant advantages in improving the safety of cells.

Figure 9:
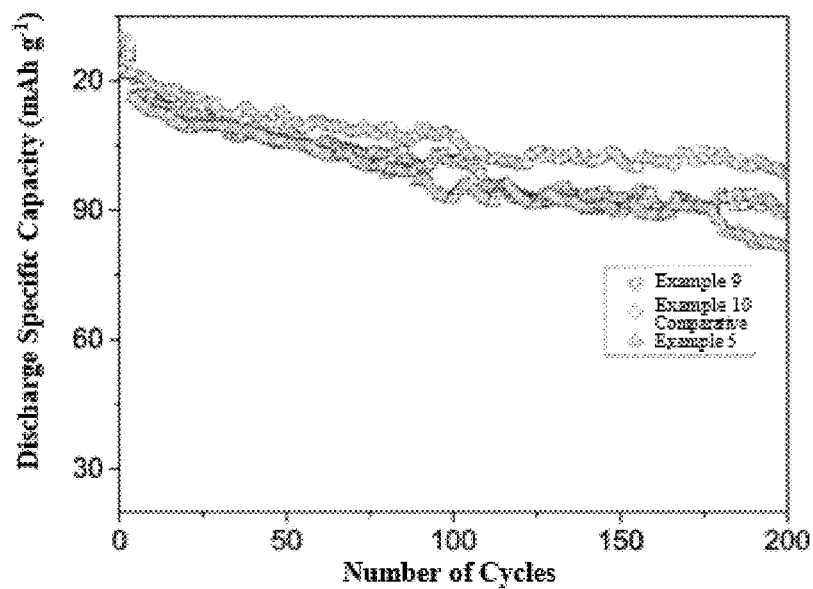
FIG. 9 shows the cycling performance of an NFM/Na cell using electrolytes of Example 9, Example 10 and Comparative Example 5 of the present disclosure.

According to FIG. 9, the electrolyte of the present disclosure is applied to a lamellar material of a sodium ion cell NaNi$_{1/3}$Fe$_{1/3}$Mn$_{1/3}$O$_3$ (NFM), and the discharge capacity of the electrolyte cell of the present disclosure is higher than that of conventional carbonate ester electrolytes. After 100 turns, the capacity retention rates of Example 9 and Example 10 are 79% and 83%, respectively, and the capacity retention rate of Comparative Example 5 is 81%, indicating that the electrolyte of the present disclosure has the capacity retention rates substantially equivalent to that of Comparative Example 5, wherein the cell of Example 10 has better cycling stability.

Figure 10:
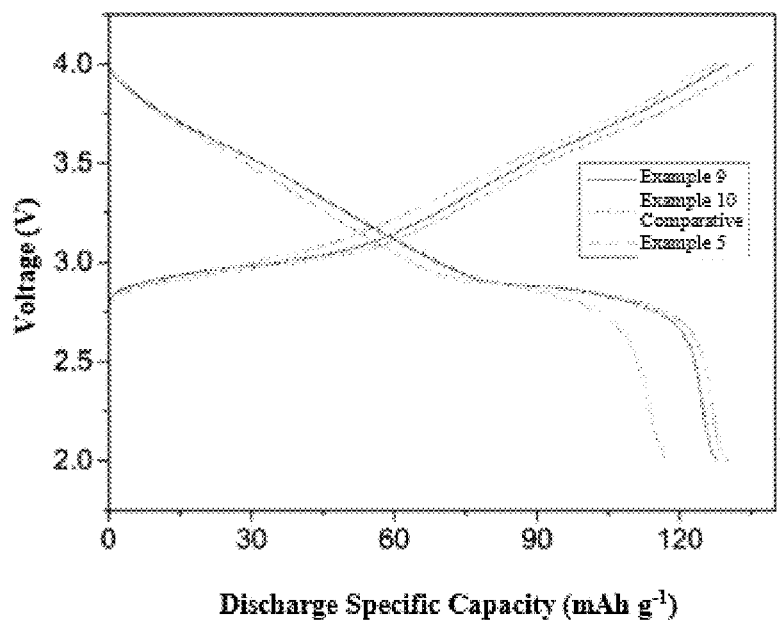
FIG. 10 is a first-cycle charge-discharge curve of an NFM/Na cell using electrolytes of Example 9, Example 10 and Comparative Example 5 of the present disclosure.

Results of Example 9 and Example 10 in FIG. 10 show that the electrolyte of the present disclosure is applied to a lamellar material of a sodium ion cell NaNi$_{1/3}$Fe$_{1/3}$Mn$_{1/3}$O$_3$ (NFM), the solvent of the electrolyte consists of a trimethyl phosphate and a 1,1,2,2-tetrafluoroethyl-2,2,3,3-tetrafluoropropyl ether, and the discharge specific capacity of the electrolyte is better at a volume ratio of the trimethyl phosphate to the 1,1,2,2-tetrafluoroethyl-2,2,3,3-tetrafluoropropyl ether of 2:1 to 1:1; the first-cycle charge-discharge capacity of the electrolyte prepared in Example 9 is 130.3 mAh/g (charge)/127.8 mAh/g (discharge), and the first-cycle coulombic efficiency is 98.1%; the first-cycle charge-discharge capacity of the electrolyte prepared in Example 10 is 135.5 mAh/g (charge)/129.9 mAh/g (discharge), and the first-cycle coulombic efficiency is 95.87%; the first-cycle charge-discharge capacity of the conventional carbonate ester electrolyte prepared in Comparative Example 1 is 133.5 mAh/g (charge)/122.5 mAh/g (discharge), and the first-cycle coulombic efficiency is 91.72%. It can be seen that the first-cycle efficiencies of the electrolyte prepared by the present disclosure are equivalent to those of the conventional carbonate ester electrolytes, and the cell has good cycling stability. Therefore, the electrolyte of the present disclosure can improve the safety of the cell, and also shows good electrochemical performance.

Figure 11:
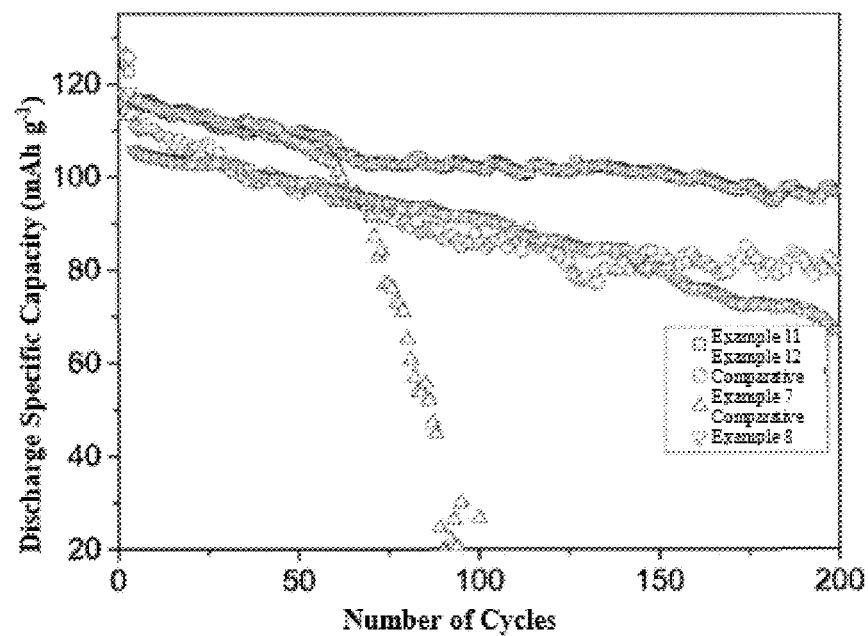
FIG. 11 shows the cycling performance of an NFM/Na cell using electrolytes of Example 11, Example 12, Comparative Example 7 and Comparative Example 8 of the present disclosure.

FIG. 11 shows the cycling performance of the electrolytes with different salt concentrations prepared in Example 11, Example 12, Comparative Example 7 and Comparative Example 8 when applied to a lamellar cathode material of a sodium ion cell NaNi$_{1/3}$Fe$_{1/3}$Mn$_{1/3}$O$_3$ (NFM). As shown in FIG. 11, when the volume ratio of the trimethyl phosphate to the 1,1,2,2-tetrafluoroethyl-2,2,3,3-tetrafluoropropyl ether is 2:1, the addition of fluoroethylene carbonate (FEC) additive can effectively improve the stability of the electrolyte and increase the capacity retention rate of the cell, especially in the case of low sodium concentration. In Comparative Example 7, the concentration of the sodium hexafluorophosphate relative to the base electrolyte is 1 mol/L, which may be caused by the low salt concentration; the solvent is constantly decomposed at the low salt concentration, and cannot form a stable interface on the negative side of Na, resulting in a serious dendritic crystal phenomenon, and finally dendritic crystals penetrate the membrane, thereby fast decreasing the discharge capacity. In Example 11, after the addition of the fluoroethylene carbonate, the capacity retention rate is significantly increased. However, in Comparative Example 8, the concentration of the sodium hexafluorophosphate relative to the base electrolyte is 2 mol/L, and the conductivity is low; although the solvent is not constantly decomposed, when the electrolyte of Comparative Example 8 is applied to a hard carbon (HC) anode material of a sodium ion cell, the first-cycle coulombic efficiency is significantly reduced compared with Example 12 (see Effect Example 3 for specific data); therefore, the electrolyte of Comparative Example 8 has poor electrochemical performance.

Figure 12:
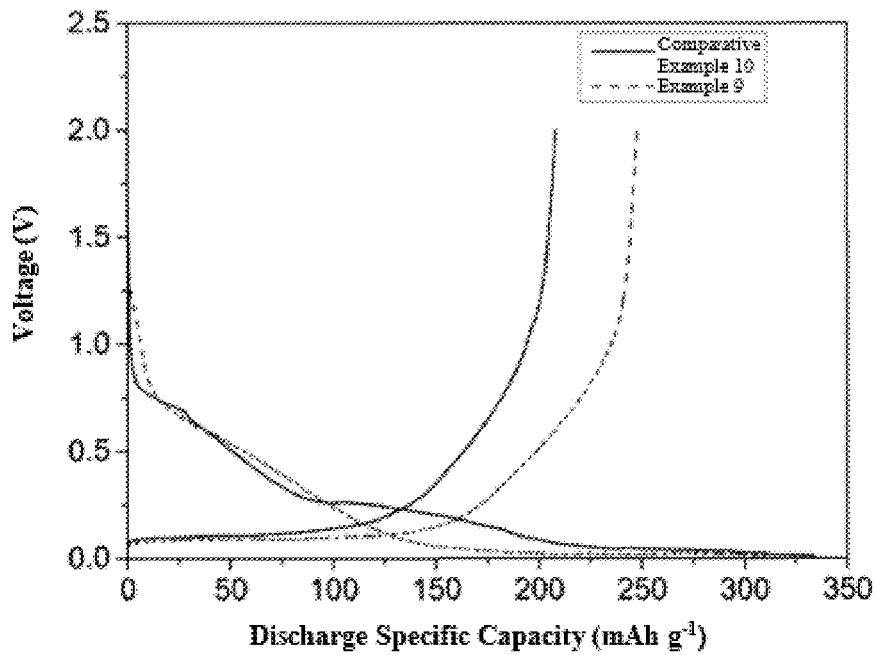
FIG. 12 is a first-cycle charge-discharge curve of an HC/Na cell using electrolytes of Example 9 and Comparative Example 10 of the present disclosure.

FIG. 12 is an image of the first-cycle charge-discharge of the electrolytes of Example 9 and Comparative Example 10 when applied to the hard carbon (HC) anode material of the sodium ion cell. In the first-cycle discharge curve of the cell of Comparative Example 10, a discharge plateau appears at about 0.25 V, because a stable SEI membrane cannot be formed on the anode surface, and solvent molecules of the electrolyte are constantly decomposed on the surface of an electrode plate. In contrast, after adding an FEC additive, the additive is decomposed as an effective anode membrane-forming agent at a potential of about 0.7 V, thus inhibiting the reduction of solvent molecules in the electrolyte.

Figure 13:
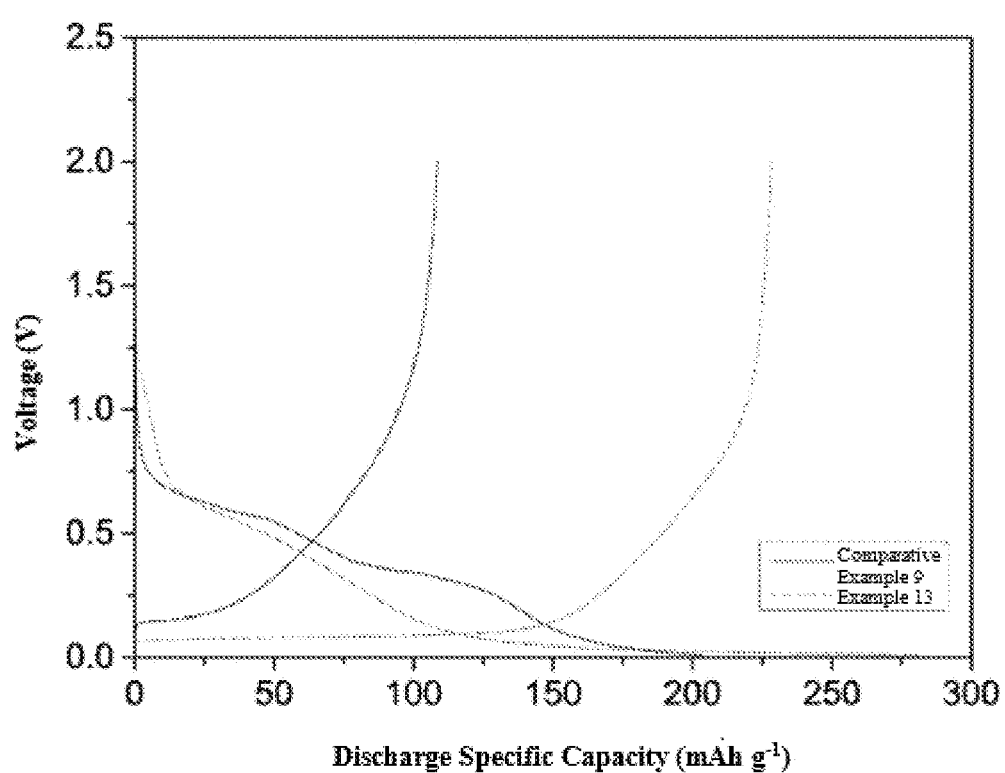
FIG. 13 is a first-cycle charge-discharge curve of an HC/Na cell using electrolytes of Example 13 and Comparative Example 9 of the present disclosure.

FIG. 13 is an image of the first-cycle charge-discharge of the electrolytes of Example 13 and Comparative Example 9 when applied to the hard carbon (HC) anode material of the sodium ion cell. As shown in FIG. 13, the electrolyte shows the same effect when the sodium perchlorate and the sodium hexafluorophosphate are applied as sodium salts in the electrolyte of the sodium ion cell, when adding an FEC additive, a discharge plateau appears at about 0.25 V in the first-cycle discharge; the discharge plateau disappears after adding the FEC additive, that is, the FEC additive preferentially forms an membrane on the electrode surface, which can effectively inhibit the decomposition of solvent molecules.

Effect Example 3

Table 1 shows charge-discharge performance tests of the secondary cells using electrolytes of Examples 9-14 of the present disclosure and Comparative Examples 5-11. Test results show that when FEC is not added to the electrolyte, the first-cycle coulombic efficiencies of hard carbon (HC)/Na anodes are significantly reduced and the electrochemical performance is relatively poor; further targeted effect test is not worthwhile. Therefore, electrochemical parameters of the electrolytes in hard carbon (HC)/Na anodes in all Comparative Examples are not tested, and "-" in Table 3 represents the untested data.

TABLE 3

| No. | Performance in $NaNi_{1/3}Fe_{1/3}Mn_{1/3}O_3$ (NFM)/Na | | | Performance in Hard Carbon (HC)/Na | |
| --- | --- | --- | --- | --- | --- |
| | First-Cycle Discharge Capacity/mAh $g^{-1}$ | First-Cycle Coulombic Efficiency/% | 100-Turn Capacity Retention Rate/% | First-Cycle Discharge Capacity/mAh $g^{-1}$ | First-Cycle Coulombic Efficiency/% |
| Example 9 | 127.8 | 98.1 | 79 | 310.1 | 80 |
| Example 10 | 129.9 | 95.87 | 83 | 226.6 | 77 |
| Example 11 | 126.5 | 95.23 | 81 | 223.4 | 71 |
| Example 12 | 127.6 | 98.28 | 78 | 266.1 | 81 |
| Example 13 | 126.5 | 95.54 | 79 | 281.5 | 81 |
| Example 14 | 120.8 | 87.18 | 73 | 170.8 | 73 |
| Comparative Example 5 | 122.5 | 91.72 | 81 | 334.1 | 82 |
| Comparative Example 6 | 116.5 | 92.95 | 77 | 216.5 | 48 |
| Comparative Example 7 | 113.3 | 96.87 | 0 | — | — |
| Comparative Example 8 | 117.9 | 94.32 | 79 | 270 | 59 |
| Comparative Example 9 | 125.5 | 94.39 | 77 | 203.8 | 53.26 |
| Comparative Example 10 | 117.4 | 92.08 | 78 | 333.8 | 62 |
| Comparative Example 11 | 111.9 | 94.72 | 82 | — | — |

Wherein, no additive is added in the electrolyte of Comparative Example 8 compared with the electrolyte of Example 12; when the electrolyte of Comparative Example 8 is applied to a hard carbon (HC) anode material of a sodium ion cell, the first-cycle coulombic efficiency is significantly reduced and the electrochemical performance is poor compared with Example 12.

When the electrolyte of Comparative Example 10 is applied to a hard carbon (HC) anode material of a sodium ion cell, although the first-cycle charge-discharge capacity is high, a discharge plateau appears at about 0.25 V (as shown in FIG. 12), which is caused by the constant decomposition of solvent molecules of the electrolyte on the surface of the electrode plate, thereby leading to poor cycling performance.

The invention claimed is:

1. An organic electrolyte, a salt, a phosphate ester and a fluoroether, and not comprising a carbonate ester, wherein the salt is a sodium salt;
the structural formula of the phosphate ester is represented by formula (1) or formula (2), wherein $R_1$, $R_2$ and $R_3$ are a $C_1$-$C_8$ alkyl or an aryl independently;
the structural formula of the fluoroether is represented by formula (3), wherein $R_4$ and $R_6$ are fluorinated or partially fluorinated carbon chains of $C_1$-$C_4$ independently, $R_5$ is $C_0$, or $R_5$ is a fluorinated or partially fluorinated carbon chain of $C_2$ or $C_3$, and n is 1, 2, 3 or 4;

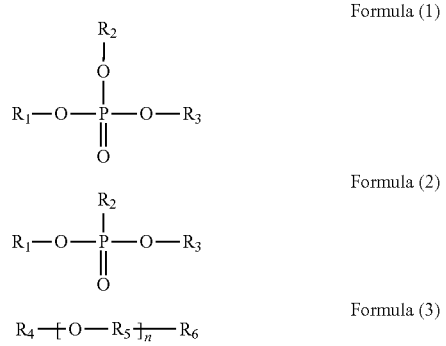

the volume of the phosphate ester is 20%-65% of the volume of the organic electrolyte;
the concentration of a sodium salt relative to the phosphate ester is greater than or equal to 3 mol/L.

2. The organic electrolyte as defined in claim 1, wherein $R_1$, $R_2$ and $R_3$ are independently alkyls of $C_1$-$C_8$ or aryls of $C_6$-$C_8$;
or, $R_4$ and $R_6$ are —$CH_2$—$CF_3$, —$CF_2$—$CHF_2$, —$CF_2$—$CF_3$, —$CF_2CF_2CF_3$, —$CH_2CF_2CF_3$, or —$CH_2CF_2CHF_2$ independently;
or, $R_5$ is $C_0$ or $C_2$;
or, n is 1, 2, or 3.

3. The organic electrolyte as defined in claim 1, wherein the phosphate ester is a trimethyl phosphate, a triethyl phosphate, a tritolyl phosphate, a triphenyl phosphate, a dimethyl methyl phosphate or a diethyl ethyl phosphate;
or, the fluoroether is a 1,1,2,2-tetrafluoroethyl-2,2,3,3-tetrafluoropropyl ether, a 1,1,2,2-tetrafluoroethyl-2,2,2 trifluoroethyl ether, or a 2H-perfluoro (5-methyl-3,6-dioxonane);
or, the sodium salt is one or more of a sodium bis-trifluoromethylsulfonylimide, a sodium trifluoromethylsulfonylmethane, sodium bis(fluorosulfonyl)imide, and a sodium bis-perfluoroethylsulfonimide.

4. The organic electrolyte as defined in claim 1, wherein the volume of the phosphate ester is 33.3-50% of the volume of the organic electrolyte;
or, the concentration of the sodium salt relative to the organic electrolyte is 0.8-2 mol/L.

5. The organic electrolyte as defined in claim 1, the concentration of the sodium salt relative to the phosphate ester is 3-8 mol/L.

6. A method for preparing an organic electrolyte as defined in claim 1, wherein the method comprises the following step of mixing well the phosphate ester, the fluoroether and the salt.

7. The preparation method as defined in claim 6, wherein the mixing process is performed under the protection of an inert gas.

8. An application of the organic electrolyte as defined in claim 1 in a secondary cell.

9. The application as defined in claim 8, wherein the secondary cell is a sodium secondary cell.

10. A secondary cell, comprising the organic electrolyte as defined in claim 1.

11. An electrolyte comprising a base electrolyte and an additive, wherein the base electrolyte comprises a sodium salt and a flame retardant solvent; the flame retardant solvent comprises a phosphate ester and a fluoroether, wherein the additive comprises a fluorine-containing additive; the fluorine-containing additive is a fluoroethylene carbonate; the concentration of the sodium salt relative to the base electrolyte is 1-2 mol/L, and the concentration of the sodium salt relative to the phosphate ester is 1.5-3 mol/L; the volume ratio of the phosphate ester to the fluoroether is 1:1 to 2:1; the mass percentage of the content of the additive to the base electrolyte is greater than 0, and less than or equal to 2 wt % the structural formula of the phosphate ester is represented by formula (1) or formula (2), wherein $R_1$, $R_2$ and $R_3$ are a $C_1$-$C_8$ alkyl or an aryl independently;
the structural formula of the fluoroether is represented by formula (3), wherein $R_4$ and $R_6$ are fluorinated or partially fluorinated carbon chains of $C_1$-$C_4$ independently, $R_5$ is $C_0$, or $R_5$ is a fluorinated or partially fluorinated carbon chain of $C_2$ or $C_3$, and n is 1, 2, 3 or 4.

12. The electrolyte as defined in claim 11, wherein the sodium salt is a sodium hexafluorophosphate and/or a sodium perchlorate;
or, the phosphate ester is one or more of a trimethyl phosphate, a triethyl phosphate, a tritolyl phosphate, a triphenyl phosphate, a dimethyl methyl phosphate and a diethyl ethyl phosphate;
or, the fluoroether is one or more of a 1,1,2,2-tetrafluoroethyl-2,2,3,3-tetrafluoropropyl ether, a 1,1,2,2-tetrafluoroethyl-2,2,2 trifluoroethyl ether, and a 2H-perfluoro (5-methyl-3,6-dioxonane);
or, the concentration of the sodium salt relative to the phosphate ester is 2.25 mol/L;
or, the concentration of the sodium salt relative to the base electrolyte is 1.5 mol/L;
or, the volume ratio of the phosphate ester to the fluoroether is 2:1;
or, the mass percentage of the content of the additive to the base electrolyte is 2 wt %.

13. The electrolyte as defined in claim 12, wherein the trimethyl phosphate is an anhydrous trimethyl phosphate.

14. The electrolyte as defined in claim 11, wherein the electrolyte consists of the sodium salt, the phosphate ester, the fluoroether, and the additive.

15. A method for preparing the electrolyte as defined in claim 11, wherein the method comprises the following step of mixing well the base electrolyte and the additive.

16. The preparation method as defined in claim 15, wherein the mixing is performed under an inert atmosphere.

17. An application of the electrolyte as defined in claim 11 in a secondary cell.

18. The application as defined in claim 17, wherein the secondary cell is a sodium secondary cell.

19. A secondary cell, comprising the electrolyte as defined in claim 11.

20. The secondary cell as defined in claim 19, wherein a cathode material of the secondary cell is a lamellar metal oxide; or, an anode material of the secondary cell is a carbon material.

* * * * *